Nov. 23, 1937.        W. I. DUGA ET AL        2,099,974
PROCESS OF MAKING SHOES
Filed July 30, 1936        2 Sheets-Sheet 1

Inventors
William I. Duga,
Alfred H. McNalley,
By J. Stanley Burch
Attorney

Nov. 23, 1937.  W. I. DUGA ET AL  2,099,974
PROCESS OF MAKING SHOES
Filed July 30, 1936   2 Sheets-Sheet 2

Inventors
William I. Duga,
Alfred H. McNalley,
By J. Stanley Burch
Attorney

Patented Nov. 23, 1937

2,099,974

UNITED STATES PATENT OFFICE 2,099,974

PROCESS OF MAKING SHOES

William I. Duga and Alfred H. McNalley, San Francisco, Calif.; said McNalley assignor to said Duga Application July 30, 1936, Serial No. 93,506

1 Claim. (Cl. 12—142)

This invention relates to the manufacture of shoes, and the primary object of the present invention is to provide an improved method of and means for lasting and attaching the upper to the shank member or the shank portion of the insole, so as to simplify the manufacturing operation, to furnish adequate strength and security at the shank without the necessity of employing numerous lasting staples or tacks or the employment of a metal-bottomed last, and to provide a maximum surface on which the outer sole of the shoe can be adhesively attached to the upper at the shank.

The above and other objects of the present invention will become apparent from the following description, when considered in connection with the accompanying drawings, in which.

Figure 1:
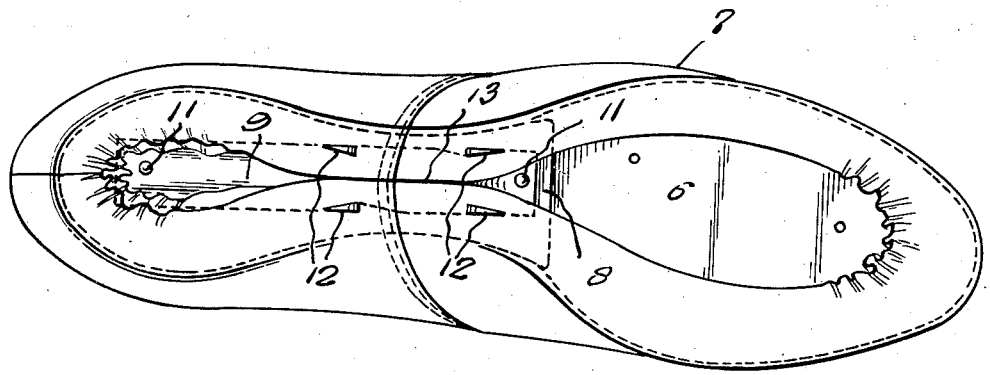
Figure 1 is a bottom plan view showing an insole and a shank member mounted on a last and an upper lasted to the insole and the shank member in accordance with the present invention.
Figure 2:
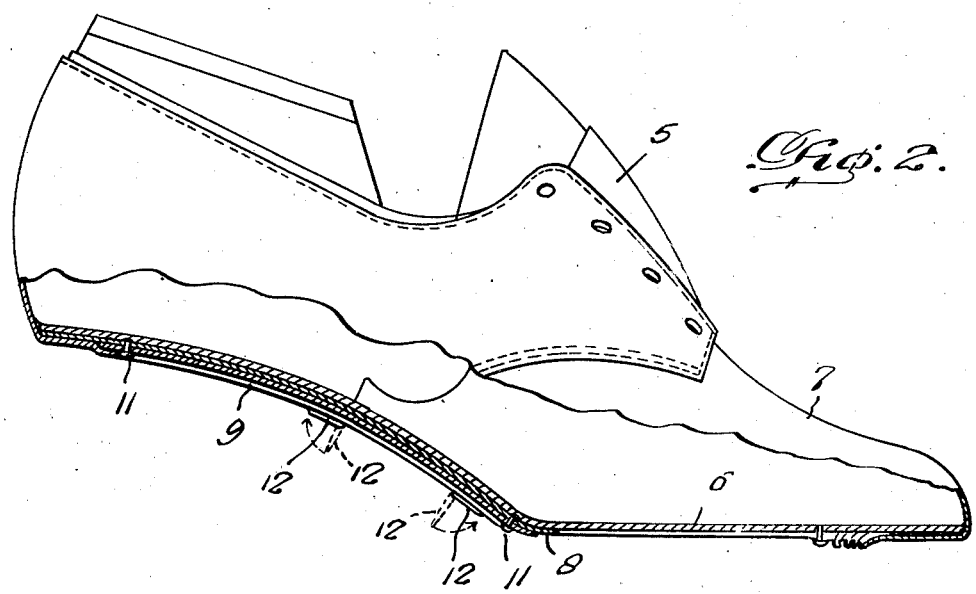
Figure 2 is a view of the construction shown in Figure 1, partly in side elevation and partly in longitudinal section.
Figure 3:
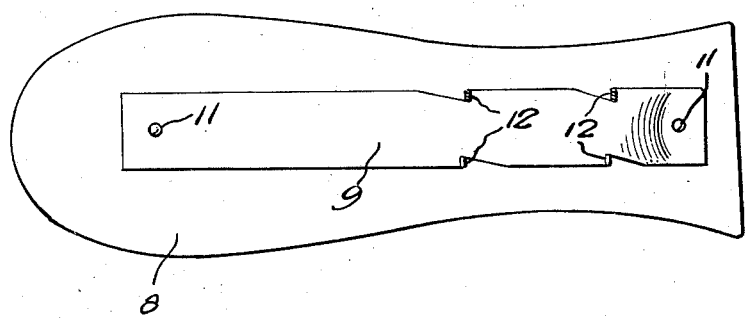
Figure 3 is a bottom plan view of the shank member and the attached shank stiffener forming part of the construction shown in Figures 1 and 2.
Figure 5:
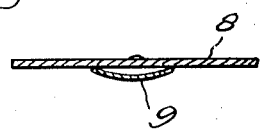
Figure 5 is a transverse section on line 5—5 of of Figure 4.

In the construction illustrated in Figures 1 and 2, 5 indicates an ordinary last, 6 an ordinary insole, 7 an upper, 8 an ordinary shank member formed of fiber, leather or other suitable material, and 9 an improved shank stiffener forming part of the present invention.

Figure 4:
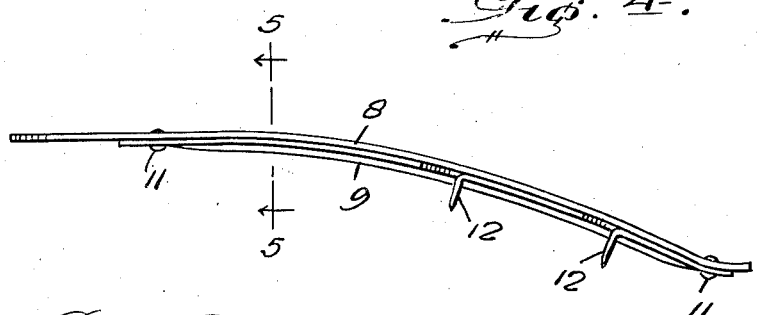
Figure 4 is a side elevational view of the construction shown in Figure 3.
Figure 6:
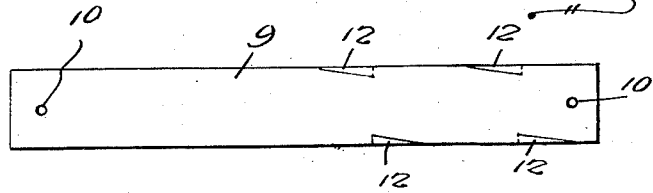
Figure 6 is a plan view of the blank from which the shank stiffener, shown in the other figures, is formed.

As shown more clearly in Figures 3 to 6 inclusive, the shank stiffener 9 consists of a strip of suitable metal formed from a flat elongated blank as illustrated in Figure 6 and shaped so as to be curved longitudinally as illustrated in Figures 2 and 4. Also, the shank stiffener 9 is preferably corrugated longitudinally as indicated in Figures 4 and 5 to provide a groove terminating short of the extremities of the strip so as to leave the end portions of the latter flat. These flat end portions have suitable apertures 10 to facilitate attachment of the shank stiffener to the shank member 8 by means of lasting tacks 11 which merely serve to locate the stiffener and prevent its displacement while the outer sole is being applied and secured. The present shank stiffener 9 differs from those commonly in use in that the same is relatively wide and has a plurality of clinching prongs 12 struck downwardly from the longitudinal edges of the forward portion thereof, said clinching prongs being adapted to pass through and be clinched upon the upper at the shank of the shoe to attach the upper to the shank member.

In the process of manufacturing the shoe, the insole 6 is mounted on the last 5, the shank member 8 with the attached shank stiffener 9 is placed on the bottom of the insole 6, and the upper 7 is pulled over the last, whereupon the margins of the upper are coated with cement and lasted and adhesively secured to the margins of the insole 6 and the shank member 8 at the fore part and heel portion of the shoe. After the upper is thus secured to the insole and shank member and while sufficient time is being allowed for drying of the cement, the upper is engaged with the clinching prongs 12 of the shank stiffener 9 at the shank portion of the shoe and the clinching prongs 12 are bent or clinched down upon the upper after being passed through the latter so as to effectively attach the upper to the shank stiffener and the shank member. In thus lasting and securing the upper to the shank member, said upper is overlapped on opposite side portions of the relatively wide shank stiffener 9, and the excess material of the lasting allowance of the upper at the shank portion of the shoe is cut away so that the opposed edges of the upper come close together as possible or substantially abut each other as at 13. The marginal edges of the upper at the shank portion of the shoe thus substantially completely overlap the shank stiffener at its forward portion but do not overlap each other, thereby presenting a comparatively wide and flat surface to which the entire shank portion of an outer sole may be adhesively attached. It will thus be seen that adequate strength and security is furnished at the shank without the necessity of numerous lasting staples or tacks or the employment of an iron bottom last. This feature is particularly valuable when the remainder of the upper is lasted to the members 6 and 8 by cement and when the outer sole is adhesively secured to the upper, a maximum surface for attachment of the outer sole to the upper at the shank portion of the shoe being afforded by completely overlapping the upper upon the shank stiffener at the shank portion of the shoe. As the shank stiffener is not extended between spaced edges of the upper at the shank portion of the shoe, a wider and stronger shank stiffener may be employed, in addition to furnishing a maximum surface for the adhesive attachment of the shank portion of the outer sole to the upper.

While we have described a construction wherein a separate shank member 8 is employed in addition to the insole 6, it is obvious that the shank stiffener 9 may be attached directly to the insole at the shank portion of the latter, in which case the separate shank member 8 would be omitted and the shank member would consist in the shank portion of the inner sole. In other words, the present invention may be incorporated in either of these two common methods of shoe manufacture. Also, it is obvious that the number, form and spacing of the clinching prongs 12 may be varied without departing from the spirit of the invention.

What we claim as new is:

The improvement in the process of making shoes which consists in supplying an insole having attached thereto a metal shank stiffener having clinching prongs struck downwardly from the longitudinal edges thereof, engaging the margins of an upper along the shank portion of the shoe with said prongs and overlapping said margins at said portion upon the forward portion of the shank stiffener, clinching said prongs upon the margins of the upper, and cutting away the excess material of the lasting allowance of the upper along the shank portion of the shoe so that the edges of said margins of the upper are disposed in non-overlapping substantially abutting relation at the shank portion of the shoe.

WILLIAM I. DUGA.
ALFRED H. McNALLEY.